United States Patent [19]
Garcia et al.

[11] Patent Number: 6,091,610
[45] Date of Patent: *Jul. 18, 2000

[54] SYSTEM AND METHOD FOR REDUCING TRANSIENT SWITCH CURRENTS IN AN ASYMMETRICAL HALF BRIDGE CONVERTER

[75] Inventors: Richard R. Garcia, Lafayette, Colo.; Rui Liu, Plano, Tex.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/056,002

[22] Filed: Apr. 6, 1998

[51] Int. Cl.[7] .......................... H02M 3/335; H02H 7/122
[52] U.S. Cl. ................................ 363/17; 363/26; 363/56
[58] Field of Search .................................. 363/17, 24, 25, 363/26, 41, 97, 98, 50, 55, 56, 131, 134

[56] References Cited

U.S. PATENT DOCUMENTS

| | | | |
|---|---|---|---|
| 4,194,238 | 3/1980 | Masaki | 363/17 |
| 4,254,459 | 3/1981 | Belson | 363/24 |
| 4,347,558 | 8/1982 | Kalinsky | 363/17 |
| 4,713,740 | 12/1987 | Drabing | 363/17 |
| 4,843,533 | 6/1989 | Roof et al. | 363/55 |
| 4,967,333 | 10/1990 | Callier et al. | 363/17 |
| 5,303,137 | 4/1994 | Peterson | 363/56 |

OTHER PUBLICATIONS

"Asymmetrical Duty Cycle Permits Zero Switching Loss in PWM Circuits with No Conduction Loss Penalty" by Paul Imbertson and Ned Mohan: Jan./Feb. 1993 IEEE: pp. 121–125.

Static and Dynamic Analysis of Zero–Voltage–Switched Half–Bridge Converter with PWM Control by Tamotsu Ninomiya, Norio Matsumoto. Masatoshi Nakahara and Koosuke Harada: 1991 IEEE: pp. 230–237.

"Family of Two–Switch Soft–Switched Asymmetrical PWM DC/DC Converters" by Phua Chee Heng and Ramesh Oruganti: 1994 IEEE: pp. 85–94.

Primary Examiner—Shawn Riley
Assistant Examiner—Bao Q. Vu

[57] ABSTRACT

Various systems and methods for providing soft-start and soft-stop to an asymmetrical half-bridge converter and a power supply employing such systems or methods. The power supply includes a power train including an asymmetrical half-bridge converter having an energy storage device coupled across a complementary switch thereof. In one embodiment, a conductive path is coupled across the energy storage device to substantially discharge the energy storage device and thereby reduce current stress in the complementary switch when the converter turns on. In another embodiment, a controller, coupled to the complementary switch, provides a drive waveform to drive the complementary switch. The controller increases a duty cycle of the drive waveform as the converter turns off.

33 Claims, 4 Drawing Sheets

SYSTEM AND METHOD FOR REDUCING TRANSIENT SWITCH CURRENTS IN AN ASYMMETRICAL HALF BRIDGE CONVERTER

TECHNICAL FIELD OF THE INVENTION

The present invention is directed, in general, to power conversion and, more particularly, to an asymmetrical half-bridge converter that employs a system and method for reducing transient switch currents therein, a method of operating such converter and a power supply employing the converter.

BACKGROUND OF THE INVENTION

The development of high-efficiency power supplies having a higher power density is a continuing goal in the field of power electronics. A switched-mode power converter is a frequently employed component of a power supply that converts an input voltage waveform into a specified output voltage waveform. There are several types of switched-mode power converters including, for instance, an asymmetrical half-bridge power converter.

A conventional asymmetrical half-bridge power converter typically includes main and complementary switches coupled to a control circuit, first and second input capacitors coupled across the main and complementary switches, respectively, an input/output isolation transformer having a primary winding and a secondary winding, a rectifier, and an output filter. The asymmetrical half-bridge converter generally operates as follows in a steady state.

The main and complementary switches alternately conduct current in a complimentary manner to convert an input DC voltage into an AC voltage. The transformer then transforms the AC voltage to another value and the rectifier generates therefrom a desired DC voltage that is filtered by the output filter. An output voltage is then provided to a load at an output of the asymmetrical half-bridge converter.

The control circuit monitors the output voltage of the asymmetrical half-bridge converter and adjusts a duty cycle of the main and complementary switches accordingly to ultimately control the output voltage. The control circuit thus provides a mechanism to maintain the output voltage at a relatively consistent level despite relative fluctuations in the input voltage and the load.

The asymmetrical half-bridge converter performs adequately in the steady state. Problems may arise, however, when the asymmetrical half-bridge converter must be turned on or turned off.

One way to turn on the asymmetrical half-bridge converter is to place it directly into the steady state from an off state. Prior to turn-on, the output voltage is zero and there is little or no voltage across the secondary winding of the transformer. Consequently, there is little or no voltage across the primary winding of the transformer. If the main and complementary switches are then switched directly to a steady state duty cycle, a current surge into the transformer, in conjunction with little or no voltage across the transformer, may saturate the transformer. High transient currents resulting therefrom may then cause one or both of the switches to fail.

One way to avoid transient currents capable of causing switch failure is to implement soft-start. Initially, the asymmetrical half-bridge converter is off and the duty cycle of the main switch is at zero. To turn on the asymmetrical half-bridge converter, the duty cycle of the main switch is gradually increased until the steady state duty cycle is reached. The output voltage may thus be gradually increased, thereby avoiding high peak currents.

Since the main and complementary switches are on for complementary periods, however, the complementary switch may initially be on for a large period of time. Energy stored in the second input capacitor may, therefore, rapidly discharge through the complementary switch during the initial switching cycles. The rapid discharge may produce a large pulse of current through the complementary switch, causing it to become damaged.

Slightly different but analogous concerns also arise when the asymmetrical half-bridge converter is turned off. Conventional techniques for turning off the asymmetrical half-bridge converter involve turning off the main switch, leaving the complementary switch on. As a result, charge stored in the second input capacitor discharges through the complementary switch, causing transient currents which may damage the complementary switch.

Accordingly, what is needed in the art is a circuit for reducing transient current through the complementary switch, thereby avoiding damage to the complementary switch during a non-steady state operation of the asymmetric half-bridge converter.

SUMMARY OF THE INVENTION

To address the above-discussed deficiencies of the prior art, the present invention provides various systems and methods for providing soft-start and soft-stop to an asymmetrical half-bridge converter and a power supply employing such systems or methods. The power supply includes a power train including an asymmetrical half-bridge converter having an energy storage device coupled across a complementary switch thereof. In one embodiment, a conductive path is coupled across the energy storage device to substantially discharge the energy storage device and thereby reduce current stress in the complementary switch when the converter turns on. In another embodiment, a controller, coupled to the complementary switch, provides a drive waveform to drive the complementary switch. The controller increases a duty cycle of the drive waveform as the converter turns off.

The present invention therefore introduces the broad concept of reducing the current stress occurring in the complementary switch as the converter turns on and turns off. Transient current through the complementary switch may thus be reduced, allowing the complementary switch to avoid damage.

In one embodiment of the present invention, the energy storage device is a capacitor. In another embodiment, the conductive path includes a device selected from the group consisting of: (1) a resistor, (2) a controllable switch and (3) an inductor. In yet another embodiment of the present invention, the complementary switch is a metal oxide semiconductor field-effect transistor (MOSFET).

In one embodiment of the present invention, the controller contains a voltage reference circuit that provides a reference voltage that ramps to increase the duty cycle as the converter turns off. In another embodiment, the controller pulse width modulates the drive waveform. In a more specific embodiment of the present invention, the voltage reference circuit includes: (1) a switch having a base, a collector, and an emitter, (2) a first timing resistor, coupled between a supply voltage and the collector and (3) a second timing resistor and a timing capacitor series-coupled between the collector and the emitter. In a still more specific embodiment of the present invention, the reference voltage ramps down to increase the duty cycle.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
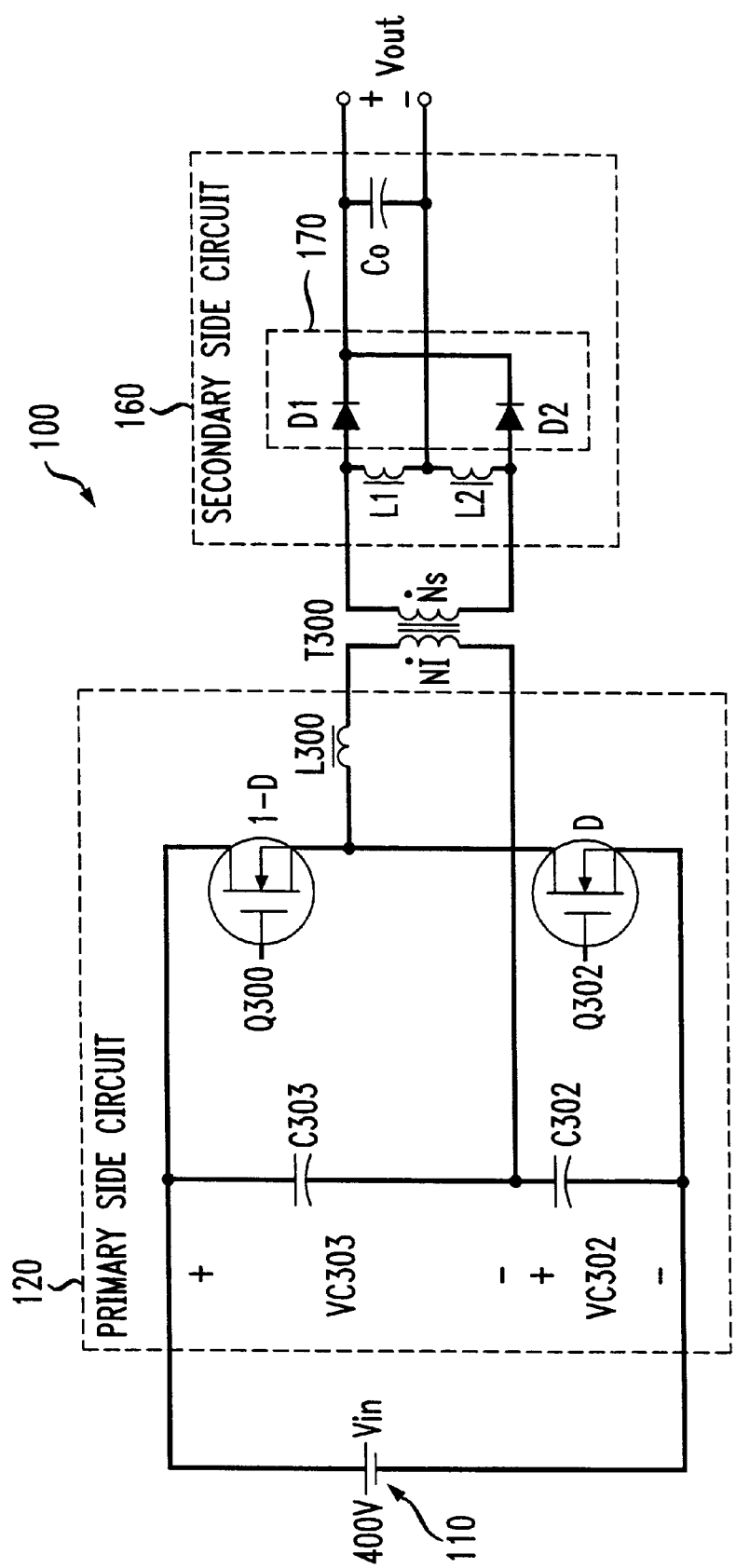
FIG. 1 illustrates a schematic diagram of a prior art asymmetrical half-bridge converter.

Referring initially to FIG. 1, illustrated is a schematic diagram of a prior art asymmetrical half-bridge converter 100. The converter 100 includes an isolation transformer T300 having primary and secondary windings N1, Ns. The converter 100 further includes a primary side circuit 120 and a secondary side circuit 160. An input of the converter 100 is coupled to a source of DC power 110 having an input voltage Vin. An output of the converter 100 provides an output voltage Vout to a load (not shown).

The primary side circuit 120 includes main and complementary switches Q302, Q300, series-coupled across the input. A control circuit (not shown) monitors the output of the converter 100 and adjusts a duty cycle of the main and complementary switches Q302, Q300 to maintain a relatively consistent output voltage. The primary side circuit 120 further includes first and second capacitors C302, C303, coupled across the main and complementary switches Q302, Q300, respectively. The primary side circuit 120 still further includes an inductor L300, series-coupled to the primary winding N1. The inductor L300 and the primary winding N1 are coupled between a first node intermediate to the first and second capacitors C302, C303 and a second node intermediate to the main and complementary switches Q302, Q300.

The secondary side circuit 160 includes first and second output inductors L1, L2 coupled across the secondary winding Ns. The secondary side circuit 160 further includes a rectifier 170, consisting of first and second rectifier diodes D1, D2, also coupled across the secondary winding Ns. The secondary side circuit 160 still further includes an output capacitor Co, coupled across the output.

The main and complementary switches Q302, Q300 are operated with an asymmetrical duty cycle (i.e., the main switch Q302 conducts for a first time period D while the complementary switch Q300 conducts for a complementary time period 1-D) to impress the input voltage Vin across the transformer T300. The duty cycle of the main and complementary switches Q302, Q300 controls a gain (i.e., Vout/Vin) of the converter 100, allowing the output voltage Vout to be kept constant despite variations in the input voltage Vin.

Prior to a turn-on of the converter 100, the output voltage Vout is approximately zero. The voltage across the transformer T300 is, therefore, also approximately zero. In the primary side circuit 120, the input voltage Vin is divided between the first and second capacitors C302, C303. First and second capacitor voltages $V_{C302}$, $V_{C303}$, may be represented by the following equations:

$$V_{C302} = Vin\frac{C303}{C302+C303}; V_{C303} = Vin\frac{C302}{C302+C303}$$

When the converter 100 is turned on, a soft-start takes place wherein the duty cycle of the main switch Q302 starts at zero and gradually increases to a steady state duty cycle Dss. The complementary switch Q300, therefore, starts at a duty cycle of 1 and gradually decreases to a complementary steady state duty cycle 1-Dss. Since the complementary switch Q300 is initially on almost continuously, the second capacitor voltage $V_{C303}$ may rapidly discharge to about zero. The rapid discharge of the second capacitor C303 may produce a large transient current through the complementary switch Q300, causing it to become damaged.

Obviously, increased reliability is a continuing goal in the design of asymmetrical half-bridge converters. One way to increase reliability is to decrease the large transient current through the complementary switch Q300 during non-steady state conditions such as turn-on or turn-off.

Figure 2:
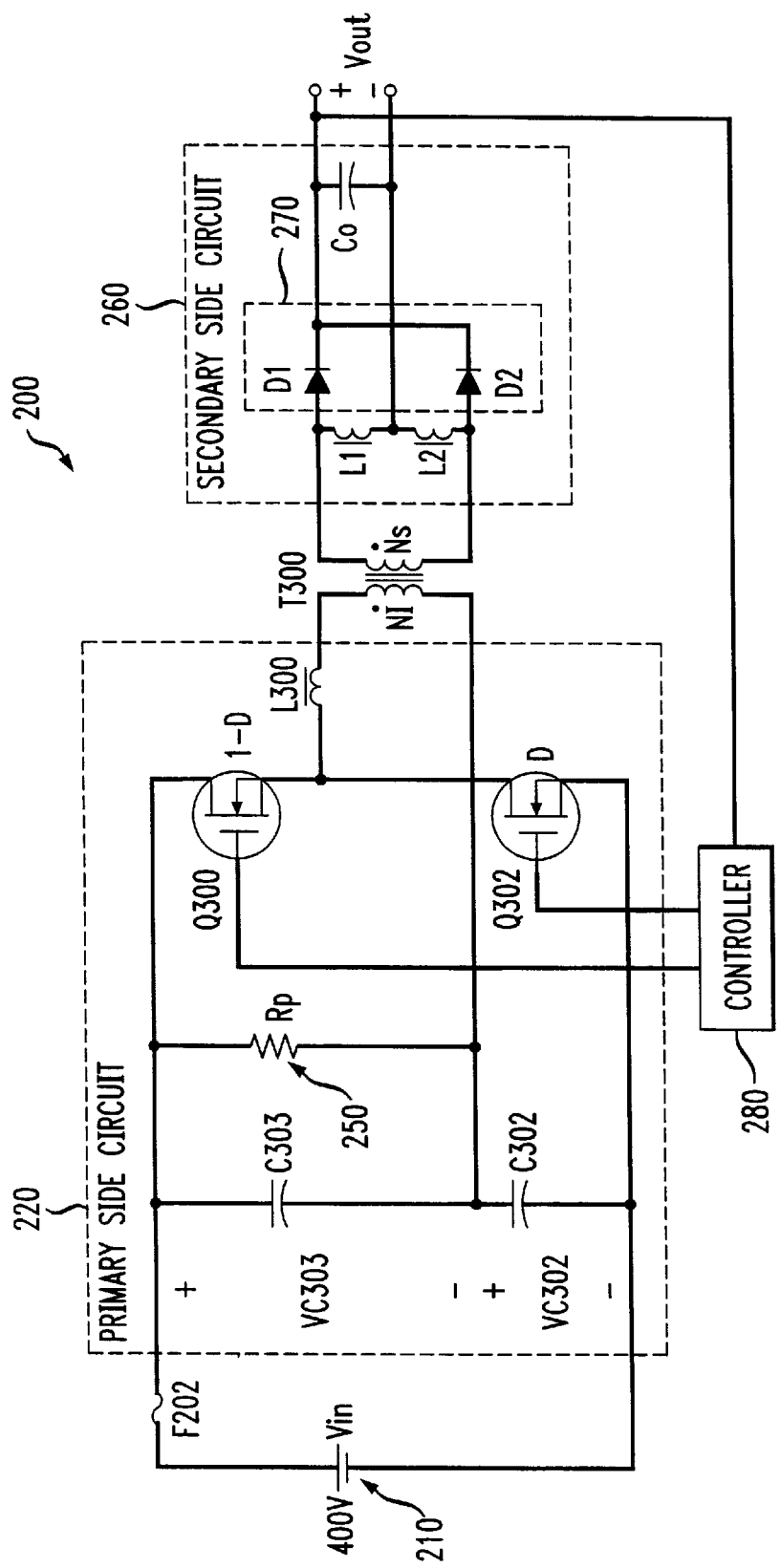
FIG. 2 illustrates a simplified schematic diagram of an embodiment of an asymmetrical half-bridge converter constructed according to the principles of the present invention.

Turning now to FIG. 2, illustrated is a simplified schematic diagram of an embodiment of an asymmetrical half-bridge converter 200 constructed according to the principles of the present invention. The converter 200 may be part of a power train used in a power supply (not shown). In the illustrated embodiment, the converter 200 consists of a primary side circuit 220 coupled to a secondary side circuit 260 via an isolation transformer T300 (having primary and secondary windings N1, Ns). An input of the converter 200 is coupled to a source of DC power 210 having an input voltage Vin. In the illustrated embodiment, the input of the converter 200 is protected by a fuse F202. Of course, the fuse F202 is not an integral part of the present invention. An output of the converter 200 provides an output voltage Vout to a load (not shown).

The primary side circuit 220 includes main and complementary switches Q302, Q300, series-coupled across the input. While the main and complementary switches Q302, Q300 are illustrated as metal oxide semiconductor field-effect transistors (MOSFETs), those skilled in the art will realize that the use of any controllable switch is well within the broad scope of the present invention. A controller 280, coupled to the main and complementary switches Q302, Q300, drives the main and complementary switches Q302, Q300 with an asymmetrical duty cycle to impress the input voltage Vin across the transformer T300. During steady state operations, the controller 280 monitors the output of the converter 200 and adjusts a duty cycle of the main and complementary switches Q302, Q300 accordingly to stabilize the output voltage Vout.

The primary side circuit 220 further includes first and second energy storage devices C302, C303, coupled across the main and complementary switches Q302, Q300, respectively. In the illustrated embodiment, the first and second energy storage devices C302, C303 are capacitors. Those skilled in the art will realize, however, that the use of other energy storage devices is well within the broad scope of the present invention. Additionally, while the illustrated embodiment of the asymmetrical half-bridge converter contains energy storage devices coupled across both the main and complementary switches, the principles of the present invention are equally applicable to other asymmetrical half-bridge converter topologies containing an energy storage device coupled across the complementary switch.

The primary side circuit 220 still further includes an inductor L300, series-coupled to the primary winding N1. The inductor L300 and the primary winding N1 are coupled between a first node intermediate to the first and second capacitors C302, C303 and a second node intermediate to the main and complementary switches Q302, Q300.

The primary side circuit 220 still further includes a circuit for reducing current stress occurring in the complementary switch Q300. The circuit consists of a conductive path 250, coupled across the second energy storage device C303. The conductive path 250 provides a path to substantially discharge the second energy storage device C303 during a turn on of the converter 200, thereby reducing current stress occurring in the complementary switch Q300. A minimum percentage of discharge may be determined such that a peak transient current through the complementary switch Q300 is less than a maximum repeatable current allowed by the complementary switch Q300. In the illustrated embodiment, the conductive path 250 includes a resistor Rp coupled across the second energy storage device C303. Alternatively, the conductive path 250 may include a controllable switch, an inductor, or another circuit capable of discharging the second energy storage device C303.

The secondary side circuit 260 includes first and second output inductors L1, L2 coupled across the secondary winding Ns. The secondary side circuit 260 further includes a rectifier 270, consisting of first and second rectifier diodes D1, D2, also coupled across the secondary winding Ns. The secondary side circuit 260 still further includes an output capacitor Co, coupled across the output.

The converter 200 operates as follows. Prior to a turn-on of the converter 200, the output voltage Vout is approximately zero. The voltage across the transformer T300 is, therefore, also approximately zero. The input voltage Vin is divided between the first and second energy storage devices C302, C303. Soft-start occurs when the converter 200 is turned on, placing the duty cycle of the main switch Q302 at zero and gradually increasing it to a steady state duty cycle Dss. The complementary switch Q300, therefore, starts at a duty cycle of 1, gradually decreasing to a complementary steady state duty cycle 1-Dss. Since the complementary switch Q300 is initially on almost continuously, energy stored in the second energy storage device C303 may rapidly discharge, producing a large transient current through the complementary switch Q300. The conductive path 250, therefore, substantially discharges the second energy storage device C303 prior to the turn-on of the main and complementary switches Q302, Q300. The complementary switch Q300 may, therefore, turn on with a reduced current stress. Transient current through the complementary switch Q300 is thus reduced to avoid damaging the complementary switch Q300.

Figure 3:
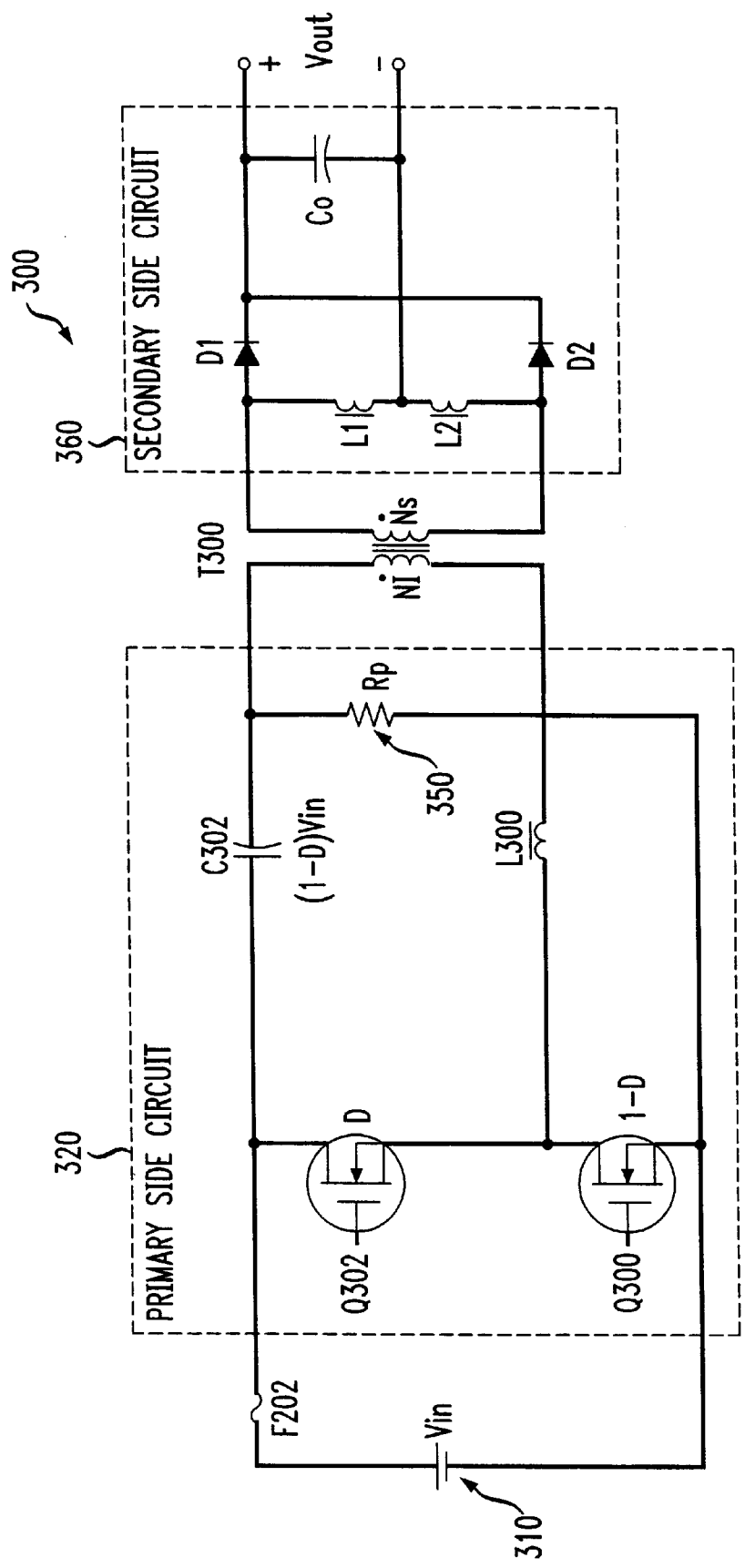
FIG. 3 illustrates a simplified schematic diagram of another embodiment of an asymmetrical half-bridge converter constructed according to the principles of the present invention.

Turning now to FIG. 3, illustrated is a simplified schematic diagram of another embodiment of an asymmetrical half-bridge converter 300 constructed according to the principles of the present invention. The converter 300 consists of a primary side circuit 320, coupled to a secondary side circuit 360 via an isolation transformer T300 (having primary and secondary windings N1, Ns). An input of the converter 300 is coupled to a source of DC power 310 having an input voltage Vin. An output of the converter 300 provides an output voltage Vout to a load (not shown).

The primary side circuit 320 includes main and complementary switches Q302, Q300, series-coupled across the input. The primary side circuit 320 further includes an energy storage device C303, series-coupled to the primary winding N1 and an inductor L300. The energy storage device C303, primary winding N1, and inductor L300 are coupled across the main switch Q302. The primary side circuit 320 further includes a circuit for reducing current stress occurring in the complementary switch Q300. The circuit consists of a conductive path 350, coupled to the energy storage device C303, that provides a path to substantially discharge the energy storage device C303. In the illustrated embodiment, the conductive path 350 is a resistor Rp. Of course, the conductive path 350 may be any circuit or device capable of discharging the energy storage device C303.

The secondary side circuit 360 is similar to the secondary side circuit 260 of FIG. 2. The operation of the converter 300 is similar to the operation of the converter 200 of FIG. 2 and, as a result, will not be described in detail. Those skilled in the art will realize that the principles of the present invention may also be employed with other configurations of the asymmetrical half-bridge converter.

With continuing reference to FIG. 2, turning off the converter 200 may also induce a current stress across the complementary switch Q300. During steady state operations, first and second charge voltages $V_{C302}$, $V_{C303}$ of the first and second energy storage devices C302, C303 may be represented as:

$$V_{C302} = (1-Dss)*Vin; \text{ and}$$

$$V_{C303} = Dss*Vin.$$

One way to turn off the converter 200 is to turn off the main switch Q302, leaving the complementary switch Q300 on. Since the complementary switch Q300 is on, energy stored in the second energy storage device C303 may rapidly discharge through the complementary switch Q300, causing it to become damaged.

Figure 4:
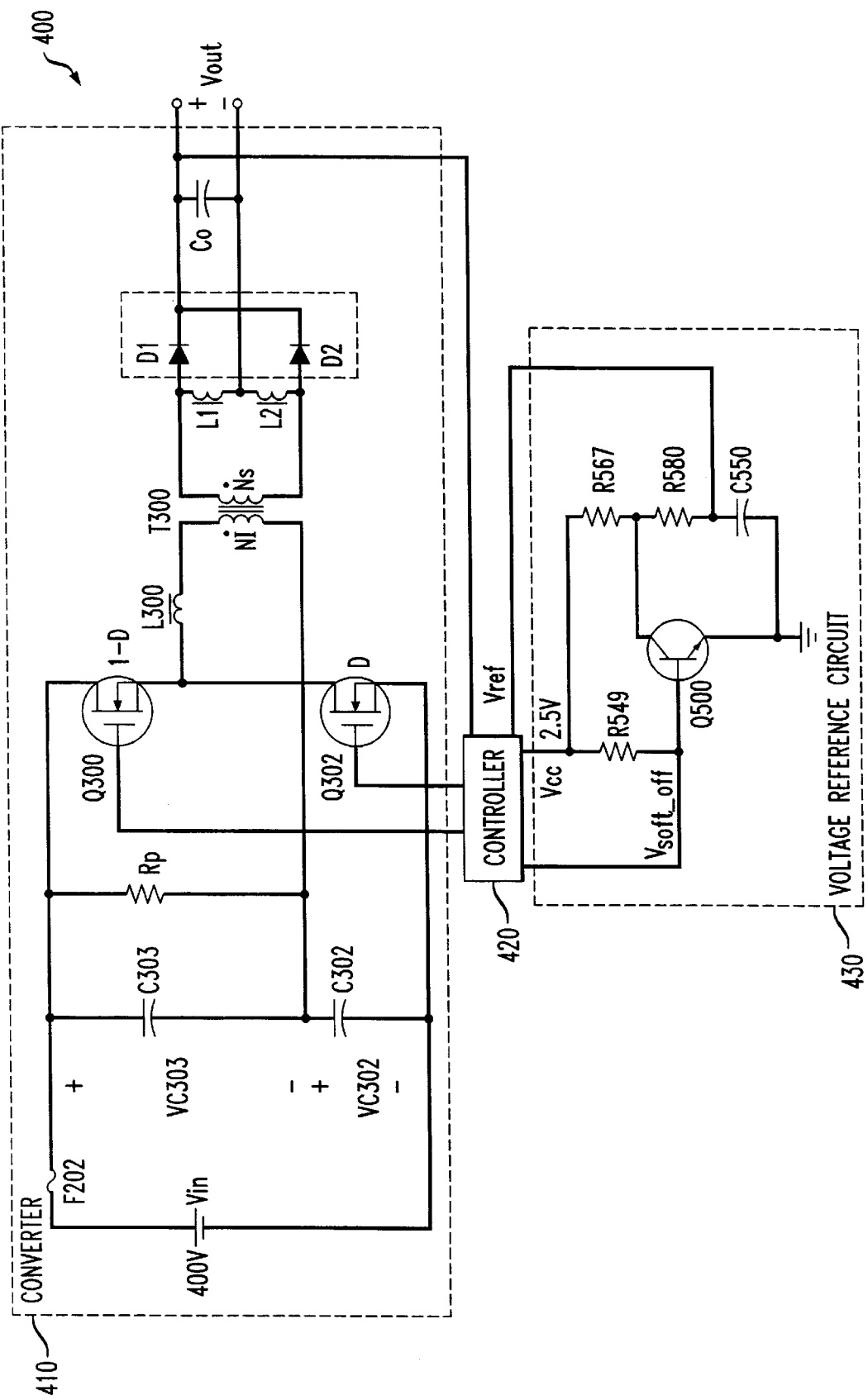
FIG. 4 illustrates an embodiment of a power supply constructed according to the principles of the present invention.

Turning now to FIG. 4, illustrated is an embodiment of a power supply 400 constructed according to the principles of the present invention. The power supply 400 consists of a power train that includes an asymmetrical half-bridge converter 410, a controller 420 and a voltage reference circuit 430. The converter 410 is similar to the converter 200 of FIG. 2, and will not be described in detail.

The controller 420 provides first and second drive waveforms to drive main and complementary switches Q302, Q300, respectively, of the converter 410. In a preferred embodiment, the controller pulse width modulates the first and second drive waveforms. In a related embodiment, the main and complementary switches are MOSFETs. Of course, the use of any controllable switch for the main and complementary switches Q302, Q300 is well within the broad scope of the present invention.

The voltage reference circuit 430 includes a switch Q500 having a base, a collector, and an emitter. In the illustrated embodiment, the switch Q500 is a bipolar junction transistor. Of course, other types of switches may also be used. The voltage reference circuit 430 further includes an input resistor R549, coupled between a supply voltage Vcc and the base. In the illustrated embodiment, the supply voltage is 2.5 V. Of course, other voltages may also be used. The voltage reference circuit 430 further includes a first timing resistor R567, coupled between the supply voltage Vcc and the collector. The voltage reference circuit 400 still further includes a second timing resistor R580 and a timing capacitor C550, series-coupled between the collector and the emitter. A reference voltage Vref is available across the timing capacitor C550.

The voltage reference circuit 430 operates as follows. A soft-stop voltage Vsoft-off is applied to the base to operate the voltage reference circuit 430. To turn on the converter 410, the soft-stop voltage Vsoft-off is set to about zero. The reference voltage Vref, therefore, ramps up from about zero to a required voltage. As the reference voltage Vref ramps up, the controller 420 accordingly increases a duty cycle D of the first drive waveform and decreases a complementary duty cycle 1-D of the second drive waveform.

In the illustrated embodiment, the controller 420 is a pulse width modulated controller. The controller 420 subtracts the output voltage Vout from the reference voltage Vref and compares a resulting voltage to a sawtooth waveform to generate the pulse width modulated first and second drive waveforms. Those skilled in the art are familiar with conventional methods for generating pulse width modulated drive waveforms. Of course, other methods for increasing the duty cycle D of the first drive waveform and decreases the complementary duty cycle 1-D of the second drive waveform are well within the broad scope of the present invention.

The reference voltage Vref thus provides soft-start to the converter 410. A soft-start time constant $\tau_1$ of the voltage reference circuit 430 may be represented as $$\tau_1 = (R567 + R580) * C550.$$

To turn off the converter 410, the soft-stop voltage Vsoft-off is set to about the supply voltage Vcc. The reference voltage Vref then ramps down from the required voltage to about zero. As the reference voltage Vref ramps down, the controller accordingly decreases the duty cycle D of the first drive waveform and increases the complementary duty cycle 1-D of the second drive waveform. A soft-stop time constant $\tau_2$ of the voltage reference circuit 400 may thus be represented as $$\tau_2 = R580 * C550.$$

The voltage reference circuit 430 thus allows the controller 420 to gradually ramp down the duty cycle D from a steady-state duty cycle Dss to about zero within a specified time period that is a function of the soft-stop time constant $\tau_2$. By gradually decreasing the duty cycle D, energy stored in an energy storage device (e.g., a capacitor) associated with the complementary switch Q300 may be discharged. The converter 410 may then be turned off once the energy storage device has been substantially discharged. Transient current through the complementary switch Q300 is reduced and damage to the complementary switch Q300 may thus be avoided.

Those skilled in the art should understand that the previously described embodiments of the asymmetrical half-bridge converter and discharge circuit are submitted for illustrative purposes only and other embodiments capable of at least partially discharging the energy storage device associated with the complementary switch are well within the broad scope of the present invention. Additionally, exemplary embodiments of the present invention have been illustrated above with reference to specific electronic components. Those skilled in the art are aware, however, that components may be substituted (not necessarily with components of the same type) to create desired conditions or accomplish desired results. For instance, multiple components may be substituted for a single component and vice-versa. Also, the concepts of the present invention may be employed with other circuit topologies.

For a better understanding of power electronics, including asymmetrical half-bridge converters, see Power Electronics: Converters, Applications and Design, by N. Mohan, T. M. Undeland and W. P. Robbins, John Wiley & Sons Publishing Company (1989); Static and Dynamic Analysis of Zero-Voltage-Switched Half-Bridge Converter with PWM Control, by T. Ninomiya, et.al., published in IEEE Power Electronics Specialist Conference (1991); Asymmetrical Duty Cycle Permits Zero Switching Loss in PWM Circuits With No Conduction Loss Penalty, by P. Imbertson and N. Mohan, published in IEEE Transactions on Industry Applications, Vol. 29, No. 1 (1993); and Family of Two-Switch Soft-Switched Asymmetrical PWM DC/DC Converters, by P. Heng and R. Oruganti, published in IEEE Power Electronics Specialist Conference (1994), incorporated herein by reference.

Although the present invention has been described in detail, those skilled in the art should understand that they can make various changes, substitutions and alterations herein without departing from the spirit and scope of the invention in its broadest form.

What is claimed is:

1. For use in an asymmetrical half-bridge converter having an energy storage device coupled across a complementary switch thereof, a circuit for reducing current stress occurring in said complementary switch, comprising:

a conductive path, coupled across said energy storage device, that substantially discharges said energy storage device and thereby reduces said current stress when said converter turns on, said converter continuing to operate while said energy storage device discharges.

2. The circuit as recited in claim 1 wherein said energy storage device is a capacitor.

3. The circuit as recited in claim 1 wherein said conductive path comprises a resistor.

4. The circuit as recited in claim 1 wherein said conductive path comprises a controllable switch.

5. The circuit as recited in claim 1 wherein said conductive path comprises an inductor.

6. The circuit as recited in claim 1 wherein said complementary switch is a metal oxide semiconductor field-effect transistor (MOSFET).

7. For use in an asymmetrical half-bridge converter having a energy storage device coupled across a complementary switch thereof, a circuit for reducing current stress occurring in said complementary switch, comprising:

a controller, coupled to said complementary switch, that provides a drive waveform to drive said complementary switch and increases a duty cycle of said drive waveform to cause said energy storage device to substantially discharge and thereby reduce said current stress as said converter turns off, said converter continuing to operate while said energy storage device discharges.

8. The circuit as recited in claim 7 wherein said controller comprises a voltage reference circuit that provides a reference voltage that ramps to increase said duty cycle as said converter turns off.

9. The circuit as recited in claim 8 wherein said voltage reference circuit comprises:

a switch having a base, a collector, and an emitter;

a first timing resistor, coupled between a supply voltage and said collector; and a second timing resistor and a timing capacitor series-coupled between said collector and said emitter.

10. The circuit as recited in claim 8 wherein said reference voltage ramps down to increase said duty cycle.

11. The circuit as recited in claim 7 wherein said controller pulse width modulates said drive waveform.

12. The circuit as recited in claim 7 wherein said complementary switch is a metal oxide semiconductor field-effect transistor (MOSFET).

13. The circuit as recited in claim 7 wherein said energy storage device is a capacitor.

14. A power supply, comprising:

a power train including an asymmetrical half-bridge converter having a capacitor coupled across a complementary switch thereof;

a conductive path, coupled across said capacitor, that substantially discharges said capacitor and thereby reduces current stress in said complementary switch when said converter turns on; and a controller, coupled to said complementary switch, that provides a drive waveform to drive said complementary switch and increases a duty cycle of said drive waveform to cause said capacitor to substantially discharge and thereby reduce said current stress as said converter turns off, said converter continuing to operate while said energy storage device discharges.

15. The power supply as recited in claim 14 wherein said conductive path includes a device selected from the group consisting of:

a resistor, a controllable switch, and an inductor.

16. The power supply as recited in claim 14 wherein said complementary switch is a metal oxide semiconductor field-effect transistor (MOSFET).

17. The power supply as recited in claim 14 wherein said controller comprises a voltage reference circuit that provides a reference voltage that ramps to increase said duty cycle as said converter turns off.

18. The power supply as recited in claim 17 wherein said voltage reference circuit comprises:

a switch having a base, a collector, and an emitter;

a first timing resistor, coupled between a supply voltage and said collector; and a second timing resistor and a timing capacitor series-coupled between said collector and said emitter.

19. The power supply as recited in claim 17 wherein said reference voltage ramps down to increase said duty cycle.

20. The power supply as recited in claim 14 wherein said controller pulse width modulates said drive waveform.

21. For use in an asymmetrical half-bridge converter having an energy storage device coupled across a complementary switch thereof, a method for reducing current stress occurring in said complementary switch, comprising:

substantially discharging said energy storage device with a conductive path coupled across said energy storage device thereby reducing said current stress when said converter turns on; and continuing to operate said converter during said discharging.

22. The method as recited in claim 21 wherein said energy storage device is a capacitor.

23. The method as recited in claim 21 wherein said conductive path comprises a resistor.

24. The method as recited in claim 21 wherein said conductive path comprises a controllable switch.

25. The method as recited in claim 21 wherein said conductive path comprises an inductor.

26. The method as recited in claim 21 wherein said complementary switch is a metal oxide semiconductor field-effect transistor (MOSFET).

27. For use in an asymmetrical half-bridge converter having a energy storage device coupled across a complementary switch thereof, a method for reducing current stress occurring in said complementary switch, comprising:

providing a drive waveform to drive said complementary switch; and increasing a duty cycle of said drive waveform to cause said energy storage device to substantially discharge and thereby reduce said current stress as said converter turns off, said converter continuing to operate as said energy storage device discharges.

28. The method as recited in claim 27 wherein said providing and said increasing are performed by a controller, said controller comprising a voltage reference circuit that provides a reference voltage that ramps to increase said duty cycle as said converter turns off.

29. The method as recited in claim 28 wherein said voltage reference circuit comprises:

a switch having a base, a collector, and an emitter;

a first timing resistor, coupled between a supply voltage and said collector; and a second timing resistor and a timing capacitor series-coupled between said collector and said emitter.

30. The method as recited in claim 28 wherein said reference voltage ramps down to increase said duty cycle.

31. The method as recited in claim 27 wherein said drive waveform is pulse width modulated.

32. The method as recited in claim 27 wherein said complementary switch is a metal oxide semiconductor field-effect transistor (MOSFET).

33. The method as recited in claim 27 wherein said energy storage device is a capacitor.

* * * * *